(12) United States Patent
Murray

(10) Patent No.: US 6,243,104 B1
(45) Date of Patent: Jun. 5, 2001

(54) SYSTEM AND METHOD FOR INTEGRATING A MESSAGE INTO STREAMED CONTENT

(75) Inventor: Peter Noel Murray, New York, NY (US)

(73) Assignee: Digital Marketing Communications, Inc., Morristown, NJ (US)

(*) Notice: Subject to any disclaimer, the term of this patent is extended or adjusted under 35 U.S.C. 154(b) by 0 days.

(21) Appl. No.: 09/208,061

(22) Filed: Dec. 9, 1998

Related U.S. Application Data

(63) Continuation-in-part of application No. 08/868,122, filed on Jun. 3, 1997.

(51) Int. Cl.[7] ........................................... G06T 3/40

(52) U.S. Cl. ..................... 345/439; 348/578; 348/586

(58) Field of Search ................................ 345/439, 115, 345/440, 116, 441, 121, 429, 127, 474, 133; 705/14, 27; 348/586, 584, 608, 578

(56) References Cited

U.S. PATENT DOCUMENTS 6,061,659 * 5/2000 Murray ................................... 705/14

* cited by examiner

Primary Examiner—Matthew Luu
Assistant Examiner—Thu-Thao Havan
(74) Attorney, Agent, or Firm—Darby & Darby

(57) ABSTRACT

A method is disclosed for integrating a message such as an icon at a specified location within a graphical image. The method includes the steps of first retrieving transformation parameters associated with the specified location of the graphical image. The message or icon is then transformed in accordance with the retrieved transformation parameters and subsequently superimposed on top of the graphical image. As a result, an integrated image is created which is conveyed to the electronic display. The method has particular industrial applicability to streamed content such as conveyed on television and over the Internet. Also disclosed is a method for identifying transformation parameters useful in specifying a locality within a graphical image wherein a frame of a graphical image is displayed as a background image and a another, preselected message is displayed as a foreground image. The method permits translation and scaling of the foreground image while the background image remains unaffected. Transformation parameters are obtained and associated with that frame of the graphical image.

20 Claims, 8 Drawing Sheets

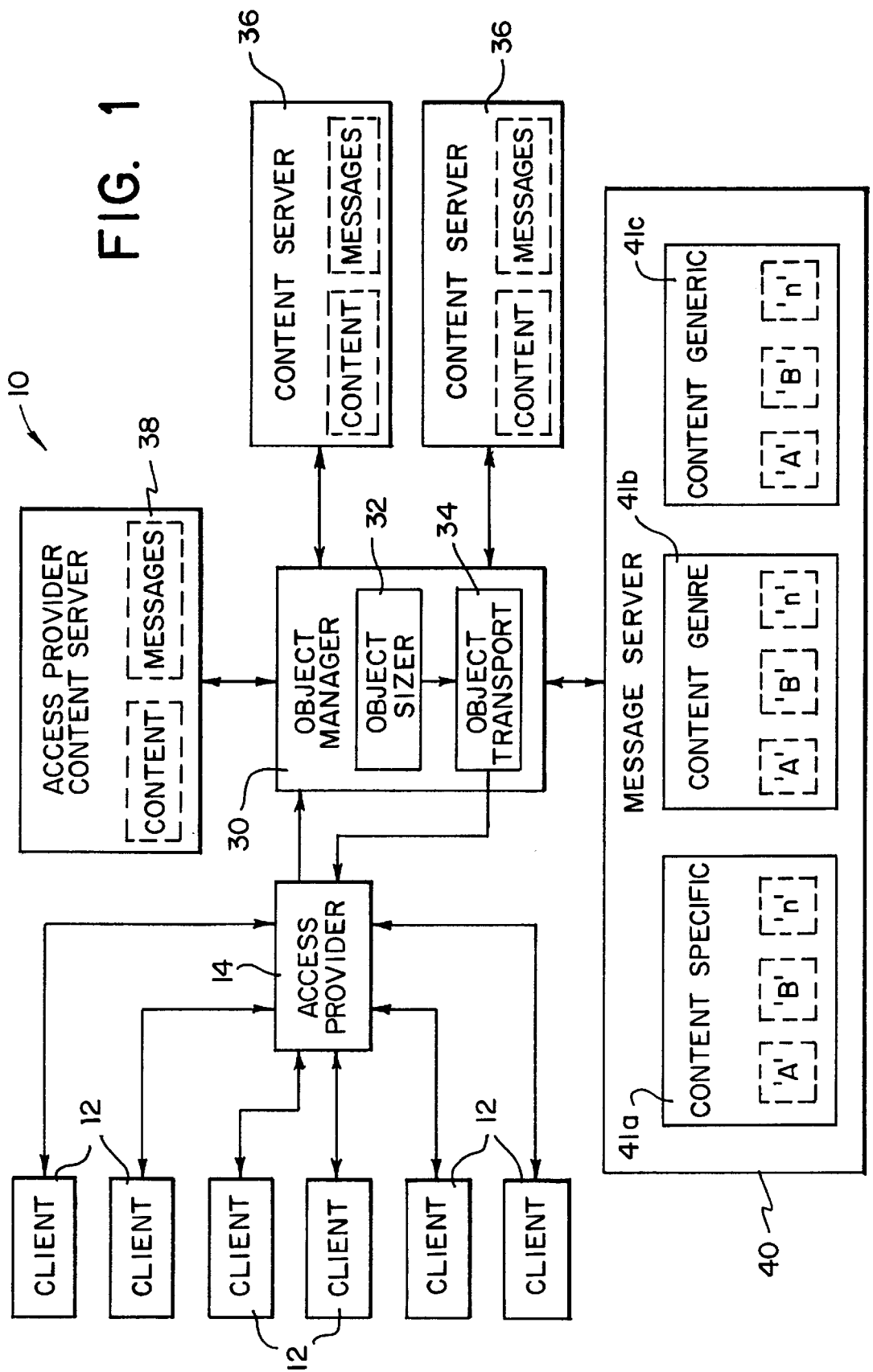

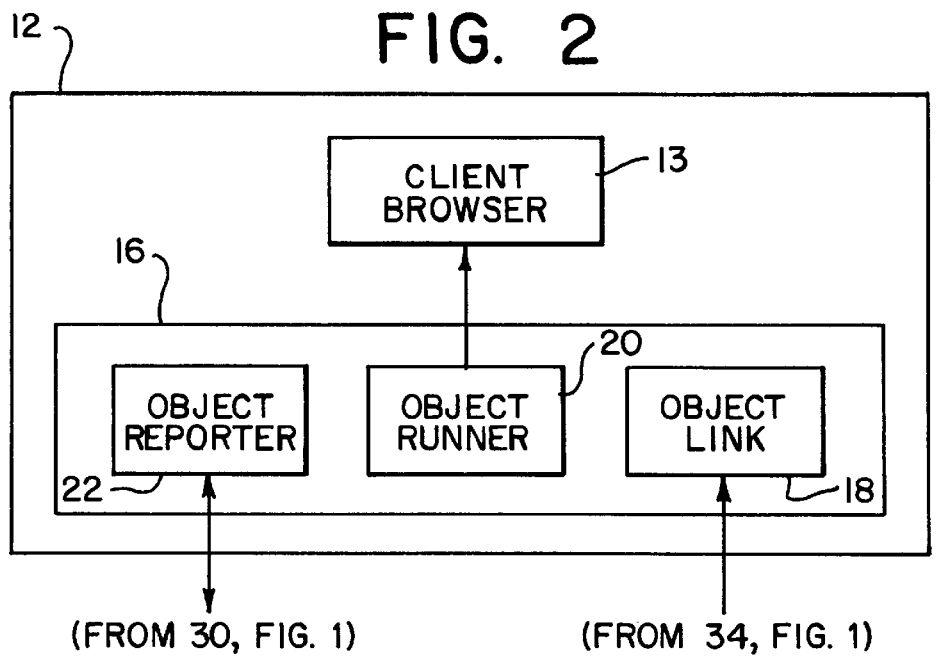
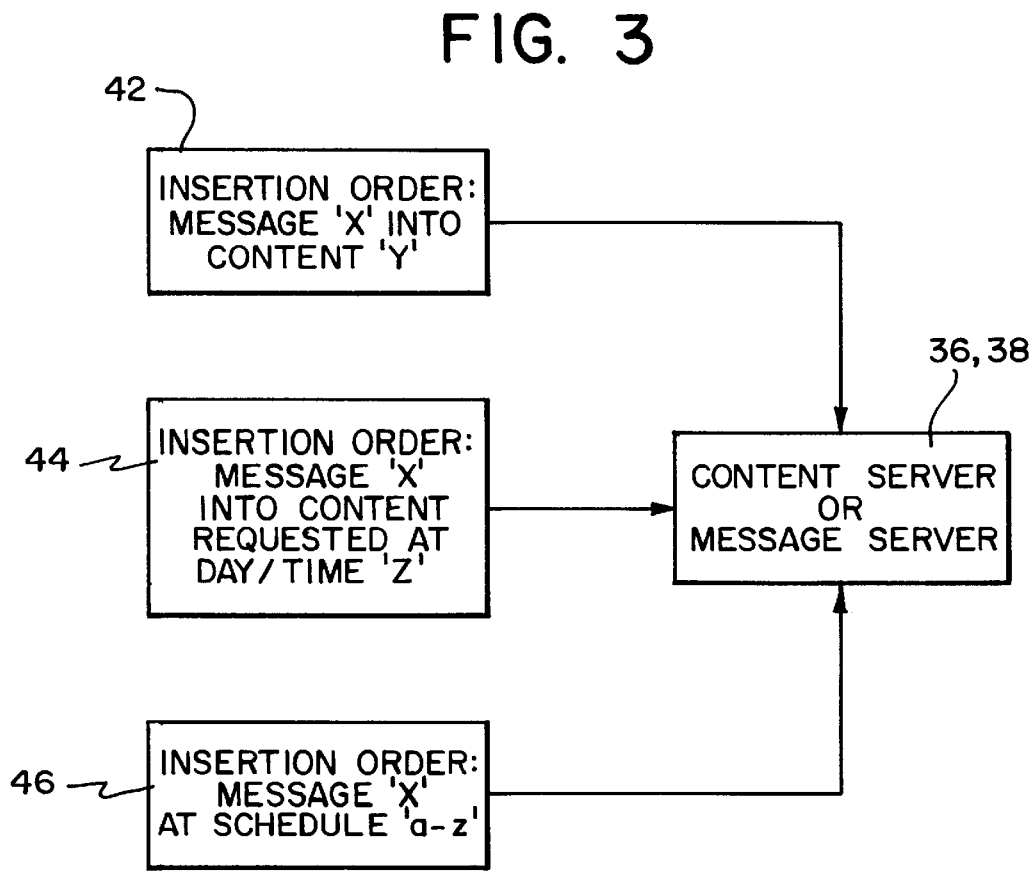

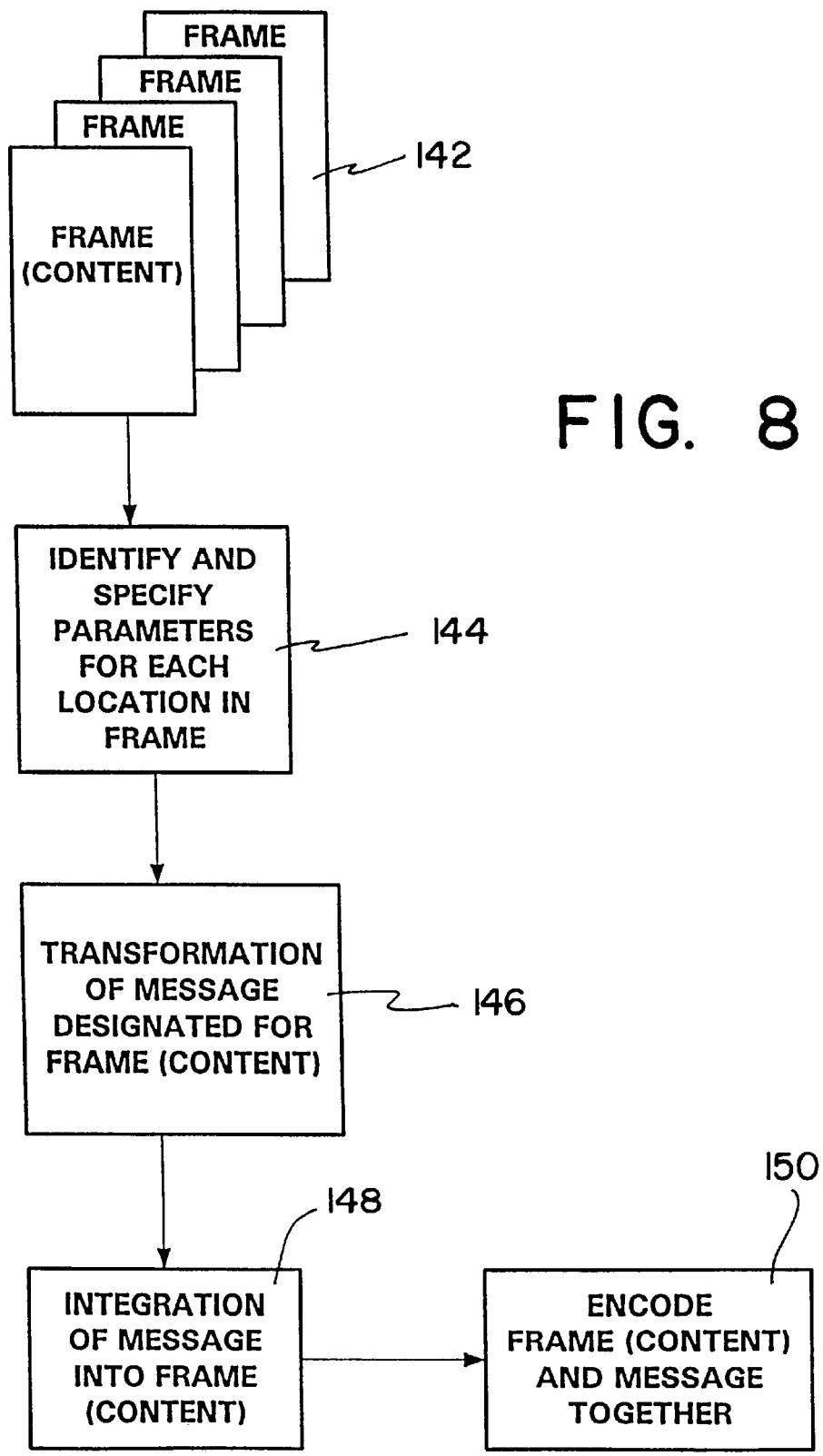

SYSTEM AND METHOD FOR INTEGRATING A MESSAGE INTO STREAMED CONTENT

This patent application is a continuation-in-part of U.S. patent application Ser. No. 08/868,122, filed Jun. 3, 1997, for SYSTEM AND METHOD FOR INTEGRATING A MESSAGE INTO A GRAPHICAL ENVIRONMENT.

FIELD OF THE INVENTION

The invention relates to methods and systems for interactively providing information to attract an individual's attention, and more particularly a method and system for automatically integrating a predetermined message into streamed content.

BACKGROUND OF THE INVENTION

Attracting public attention to specific information such as a commercial message typically involves a level of creative and communications expertise and knowledge of consumer psychology. The success or failure of a business endeavor often hinges on the public dissemination and follow-on awareness of a message related to the endeavor. If a message is compelling enough to warrant notice, the public is more likely to respond. However, should the information be conveyed in an uninteresting manner that fails to attract the attention of a consumer, expensive marketing campaigns may have little to no effect on consumer attitudes, behavior or other effects sought by the endeavor.

Traditional ways of conveying information or messages have evolved around conventional forms of mass media, namely print (newspapers and magazines), and broadcast (television and radio). Typically, a conventional advertising campaign consists of a small number of print ads and/or broadcast commercials directed at a target audience. Individuals exposed to the messages typically have varying cognitive responses based on the level of attention given the message, the saliency of the message, and the language and visual effects incorporated into the message. Mass distribution of the messages, whether by print and/or broadcast solicits the consumer attitudes, behavior or other effects sought by the endeavor to accomplish its objectives.

More recently, new forms of media have emerged. These relatively new technologies, including CD-ROMs, the Internet, and interactive television, enable individuals to interact with media, rather than passively experience one-way communication, characteristic of traditional print and broadcast. The most prominent of these new technologies is the Internet.

The Internet represents a vast computer network operating under the general framework of a client-server model. The network includes, generally, a plurality of interconnected computers or servers configured to store, transmit, and receive computer information. Designated servers host one or more "web sites" accessible electronically through a private Internet access provider or an on-line access provider. A unique address path or Uniform Resource Locator (URL) identifies individual web sites or pages within a web site. Internet users, or clients, utilizing software on personal computers ("client software") such as a web browser, may access a particular web site merely by selecting the particular URL or linking to that site from another site.

An important aspect of the Internet is the World Wide Web (WWW). The WWW comprises a collection of specialized servers on the Internet that recognize the Hypertext Transfer Protocol (HTTP). Generally, HTTP enables access to a wide variety of server files, or "content" using a standard language known as Hypertext Markup Language (HTML). The files may be formatted with HTML to include graphics, sound, text files and multi-media objects, among others.

Methods of conveying information or messages to attract attention to products and services on the Internet often comprise "repackaged" versions of traditional mass media advertising. Internet advertising typically consists of a "banner" appearing in and/or with documents and other information selected by the user. The objective is for the user to click on the advertiser's banner, (known as "clicking-through"), to access the advertiser's information on the Internet. This marketing strategy resembles a method of attracting an individuals attention by the headline of a print advertisement and drawing the person into reading the body copy.

Generally, approximately fifty-percent of Internet advertising appears in web browsers and search engines. These Internet tools comprise software utilized by Internet users to access, through an Internet access provider, desired documents, streamed video and audio and information, otherwise referred to generally herein as "content." An example of one method is disclosed in U.S. Pat. No. 5,572,643 to Judson. The method includes displaying a web page having a link to a hypertext document (HTML file) located at a remote server. According to that method, following the user's selection of the link, the browser displays one or more messages during the time taken to download the selected document. Once the desired content appears, the message disappears.

While this method displays information or messages to a user, the message itself is typically unrelated to and detached from the downloaded content. Because the browser and/or search engine normally operate as initial steps the user must take to access desired entertainment information or other content, the user's interest in what appears on the screen displaying a browser or search engine is minimal as compared to the potential interest of the user when the message is shown during the display of the downloaded content itself. In other words, advertising presented on the Internet in this manner fails to benefit from an interesting content environment to stimulate the user's attention.

Another problem with conventional Internet advertising involves habits traditionally accepted by audiences in focusing attention on commercial messages. In the banner-to-click-through method of advertising, the user must make a voluntary, active effort to go beyond the information contained in the banner and view the complete information message of the advertiser located at the advertiser's site or other location on the Internet. This advertising approach falls outside the context of existing media behavior. By its nature, advertising is an intrusive rather than voluntary communication with a consumer.

Apart from the problems regarding the failure to adequately attract attention of an audience, conventional advertising models implemented on the Internet reflect relatively undesirable economic disadvantages as well. Within the current model, the cost per click-through to the advertiser is above levels that most consumer products and services marketers can afford to reach a prospective customer. This relatively high expense typically precludes entry into the Internet medium by manufacturers of consumer-packaged goods that would otherwise engage in advertising activities on the Internet. Accordingly, the majority of the advertising on the Internet involves messages for Internet and computer companies and large expenditure products such as automobiles.

Therefore, the need exists for a method and system of conveying information within user-selected content to increase the level of attention afforded by the information to the user. The need also exists for such a method and system to be economically viable to ensure availability to all marketed goods and services. The method and system of the present invention satisfies these needs.

SUMMARY OF THE INVENTION

The method and system of the present invention provides the capability of integrating information, such as a message or icon, into content selected by a user with an appropriate scale. The inclusion of the message into the content itself substantially improves the level of attention afforded the message by the user. As a result, the message is more likely processed and retained cognitively by the user to influence the consumer attitudes, behavior or achieve the other effects sought by the advertiser. Moreover, the method and system of the present invention may be implemented in the standard Internet architecture with minimal hardware and software costs.

In accordance with a salient aspect of the present invention, a method is provided for integrating a message such as an icon or applet at a specified location within a graphical image for display on an electronic display such as a television screen or computer monitor. The method includes the steps of first retrieving transformation parameters associated with the specified location of the graphical image. The message or icon is then transformed in accordance with the retrieved transformation parameters and subsequently superimposed on top of the graphical image. As a result, an integrated image is created which is conveyed to the electronic display. The method has particular industrial applicability to streamed content such as conveyed on television and over the Internet.

In accordance with another salient aspect of the invention, a method for identifying transformation parameters useful in specifying a locality within a graphical image is provided. The method displays a frame of a graphical image as a background image and superimposes another, preselected message as a foreground image on the display screen. The method permits both translation and scaling of the foreground image while the background image remains unaffected. The translation information defines a selected locality within the graphical image. The scaling defines a selected scale factor for the selected scale at that locality within the graphical image, relative to a predetermined size associated with the preselected message. The selected locality and the selected scale factor are associated with that frame of the graphical image as the transformation parameters for that frame. This method also has industrial applicability to streamed content such as conveyed on television and over the Internet. Further features of this method include the following steps, alone or in combination:

(a) permitting rotational orientation of the foreground image while the background image remains unaffected;

(b) permitting the position, amount, and color of the light to be cast upon the foreground image to be modified to match the lighting at the selected locality of the graphical image;

(c) advancing the graphical image to a subsequent frame and repeating steps described above;

(d) digitizing the graphical image into plural frames for individual display on the display screen of the computer as individual background images; and (e) providing an applet as the preselected message.

Yet another salient aspect of the invention concerns a method for identifying transformation parameters useful in specifying a locality within a graphical image including plural frames. That method is similar to the method described above, but is more particularly directed to a graphical image which includes plural frames of images. Within several of the frames is a reference object that the user can select. The reference object has at least one dimension, for example, height, which is determined from frame-to-frame. Changes in the dimension of the reference object are associated with the frame such that the reference object provides an objective basis for dynamically rescaling the message from frame-to-frame.

To realize the above described advantages, the invention, in one form, comprises a method of conveying information to a user in specified content displayed in an interactive graphical environment. The information comprises a predetermined message defined by message parameters to create an image and stored in a message memory. The content includes predetermined specifications for assimilating said message. The method comprises the steps of retrieving the specified content from a content memory then identifying the predetermined specifications from the content for substituting a portion of the content into a transformed representation of the predetermined message. After retrieving and identifying, the predetermined message is obtained from the message memory and transformed into a scaled message according to the specifications to substitute the message into the content portion and define a modified environment. After substitution, the method concludes by communicating the modified environment to the user, whereby the message, having been assimilated into the content, attracts substantial attention to effect improved cognitive processing and recall.

In another form, the invention comprises an interactive system for assimilating information in user specified content and displaying the content in a graphical environment through a computer network to a user. The information comprises at least one message for attracting attention to enhance cognitive processing and recall and stored in a message memory connected to the network. The content includes predetermined specifications for assimilating the message. The system includes means for retrieving the specified content from a content memory and means for identifying the predetermined specifications for substituting a portion of the content into a transformed representation of the predetermined message. The system further includes means for obtaining the predetermined message from the message memory and means for transforming the predetermined message into a scaled message according to the specifications to substitute into the content portion and define a modified environment. Also included is a means for communicating the modified environment to the user whereby the message, having been assimilated into the content, attracts substantial attention to effect improved cognitive processing and recall.

In yet another form, the invention comprises an object manager for use in an interactive system to transform user selected content into modified content conveying information comprising at least one message for attracting attention. The object manager includes means for retrieving scale information concerning a predetermined scale factor of the content portion and means for scaling the information according to the scaling factor. Also included is a means for integrating the scaled information into the content.

Other features and advantages of the present invention will be apparent from the following detailed description when read in conjunction with the accompanying drawings.

BRIEF DESCRIPTION OF THE DRAWINGS

FIG. 1 is a block diagram of an interactive communications system according to a first embodiment of the present invention;

FIG. 2 is a block diagram of the client of FIG. 1;

FIG. 3 is a function diagram illustrating insertion orders according to the invention for the interactive system of FIG. 1;

FIG. 4b is a function diagram illustrating further steps in the method of FIG. 4a;

FIG. 8 is a diagram illustrating steps related to integrating a message or icon into content.

DETAILED DESCRIPTION OF THE INVENTION

Figure 4A:
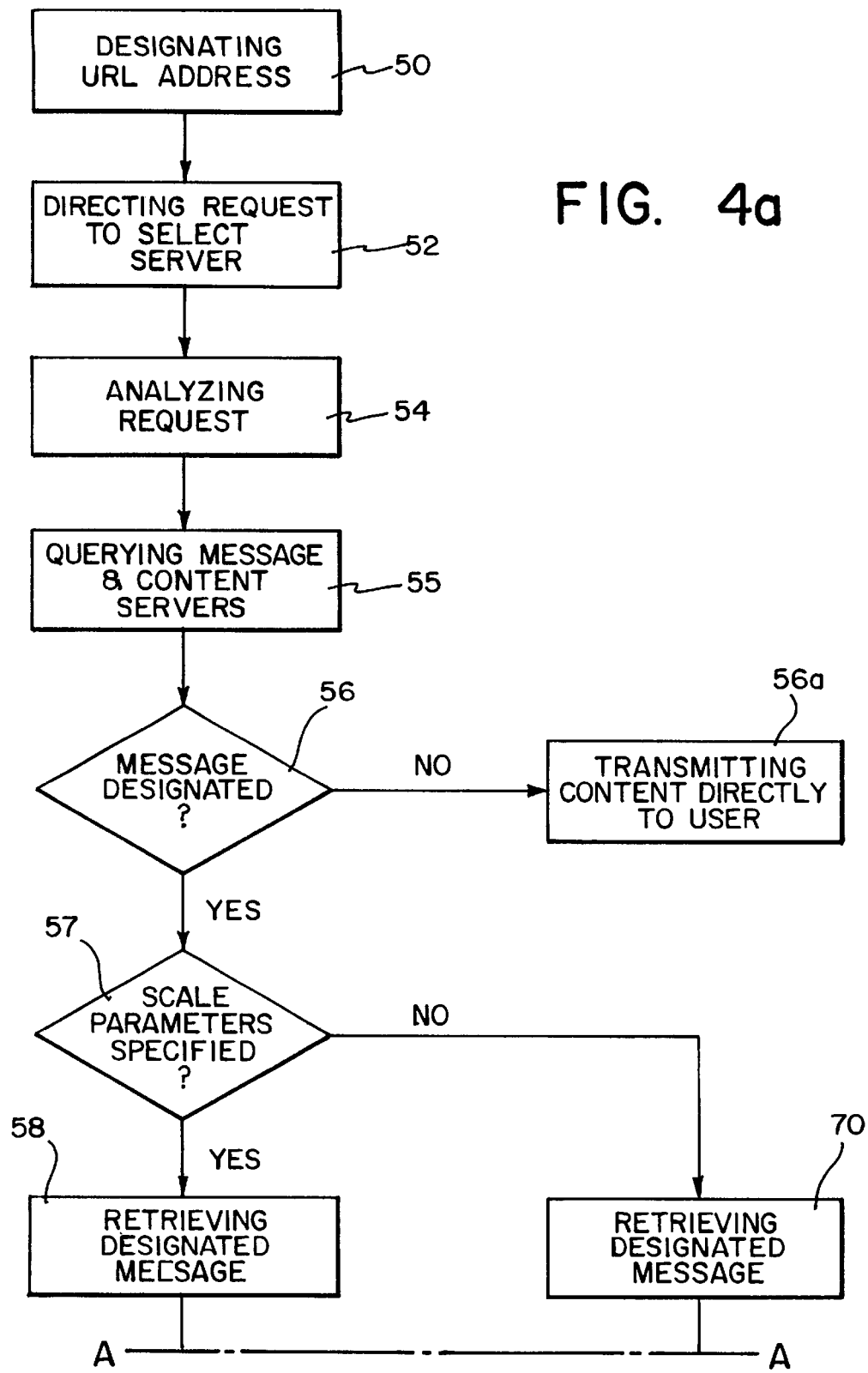
FIG. 4a is a function diagram illustrating steps according to one embodiment of the method of the present invention.

By way of overview and introduction, and referring to FIGS. 1 and 2, an interactive system according to a first embodiment of the present invention is shown utilizing the basic architecture of the Internet. The system comprises a computer network, generally designated 10, having an object manager 30 which scales and integrates information such as a message from a message server 40 or content servers 36 and 38 into selected content retrieved from a content server 36 or access provider content server 38. Content may be stored either on the access provider content server 38 or content servers hosting web sites 36. Likewise, messages may be stored on any content server and/or a message server.

The system 10 includes at least one user or client 12 comprising a computer running under an HTML compliant web browser 13 (FIG. 2) that supports a graphical user interface to display formatted files or content. Preferably, the browser is also VRML (virtual reality modeling language) compliant. The computer includes an interactive communications device such as a modem or line such as a cable (not shown) responsive to commands initiated by the user or host server through software to establish communication with a remote Internet access provider 14 or on-line Internet service.

Referring more particularly to FIG. 2, the client 12 includes software defining an object placer 16 that works in conjunction with the web browser to enable specific information, or messages, to appear in the selected content in a scale corresponding to the relative feature sizes displayed in the content and in the specific locations designated. The object placer includes an object link 18 for receiving requests from an object transport 34 which is a function of the object manager 30. An object runner 20 displays the information in a predetermined location (and perhaps at a designated time coded frame of streamed content) pursuant to specifications programmed into the content, and according to a selected scale determined by the object manager. An object reporter 22 dynamically communicates with the object manager. The object reporter provides specific information to the object manager so that the object manager can, in turn, manage interactive features within particular content. User activity such as whether a mouse has been passed over the content or whether a button has been pressed is handled directly by the client browser 13 because such interaction is due to, for example, an applet already loaded at the client 12. User activity can also be reported back to the object manager 30 which could then respond with additional information or content or log the user's activity in a file, for example.

With reference to FIGS. 1 and 2, the object manager 30 communicates through the Internet via an access provider 14 and replies to requests and initiates instructions to the client according to the method of the present invention. Included in the object manager is an object sizer 32 for resizing graphic images to match the relative feature scale included within the selected content. To control the transmission of messages to the client, the object manager employs an object transport 34. The object manager preferably takes the form of software, such as an application program, daemon, plug-in or helper applications which launches automatically when the message is detected (e.g., by a particular, assigned file type), but may also be implemented in hardware in the form of a web server.

With continued reference to FIG. 1, the object manager 30 is connected to one or more content servers 36 or access provider content servers 38 via a computer network. The servers 36 and 38 are responsive to requests made by the browser, through the object manager, to transmit respective web site documents selected by the user. The documents are typically formatted in HTML and/or VRML to provide specific content when viewed through the selected browser. In accordance with the present invention, however, the selected content includes specifications (e.g. HTML code) identifying selected parameters for integrating a message retrieved from a message server 40 or content server into a predetermined portion of the content. The invention has utility, however, when implemented in other languages, HTML being a presently preferred mode. In this way, the physical features of the message correlate with the physical features of the content. The specifications preferably include a scaling factor to identify the relative size range of the content features, as well as the coordinates in the content where the message will be integrated. Moreover, to more flexibly integrate the messages into two-dimensional, or perspective environments (such as VRML), the scaling factor may include parameters defining the perspective orientation of the physical location within the graphic image, and perhaps lighting parameters such as the relative placement of the light, its color, hue, and intensity. Examples of commands for practicing the present invention in HTML are shown in Table I below.

TABLE I

Message Server Commands

| | |
|---|---|
| parseObj {objID[, objID...]} | Query MS for Object (objID), not in local OD |
| initMS [sessionID] | Contact MS [with session ID#] |
| reqMODcheck | Request a checksum, compare local OD with master OD [MOD] |
| initRepl [sessionID] | Begin OD replication, transfer control to initStream(), pass [sessionID] |
| listen [port] | Open up a listen, [specified port]; watch for broadcasts from MS |
| doCRC {#} [, [16,32]] | Perform CRC-16, or CRC-32 checksum on local OD, file reference (#) |

Object Manager Commands

| | |
|---|---|
| aLink (bType, cMem, aEnabled) | Start Link, initiate session ID# and get standard client information (Browser [bType], client memory [cMem], [Aries] enabled? [aEnabled] |
| eLink [#] | End Link [#], terminate link, return status (stat) to host |
| xLink(stat) | Exit Link, return status (stat) to client |
| initStream [(v), wSize] | Begin streamed data transfer [v], defaults to maximum window size supported by current transport. Forced window size [wSize] may be specified if necessary. |
| statStream(v, {stat}) | Return status (stat) of stream(v) to host, test of OK to proceed with doStream |
| closeStream(v) | Close stream (v) |

Object Placer Commands

| | |
|---|---|
| doStream[(v)], wSize] | Send streamed data frame for thread [v], using current (default) or specified window size |
| aWait [#ticks \| readyState] | Wait specified # clock ticks, or until OM receives a CTS signal from the client |
| killStream [(v)], p] | Kill runaway stream (v), priority level (p) |
| gObject [#] | Get object # |
| nObject | New object, returns object # |
| dObject [#], #...] | Delete object #, specify single or range of object numbers |
| sObject [#,X, Y, Atab] | Send Object #, X Axis, Y Axis, Attribute Table |
| pObject [#] | Send Pulse to Object # |
| qObject [#, Val] | Query Object #, Function returns Val as state |
| mObject [#, X, Y, Atab] | Move/resize Object #, X Axis, Y Axis, Attribute Table |
| cSize [#, Atab] | Resize Object #, Attribute Table |
| zRot [#, dRad[,loop{boolean}] | Rotate specified object[#], degrees in radians [loop] |

With continued reference to FIG. 1, the message server 40 is connected to the same network as the object manager 30 and the content servers 36 and 38. The message server stores and transmits files representing one or more messages such as content specific messages 41a, content genre messages 41b, and content generic messages 41c for integration into the desired content according to the predefined HTML specifications. Using HTML tags, the locations within the content are identified where messages can replace, overlay, add to, mask, or otherwise display information existing at those specified locations or be displayed in the foreground if the object placer 16 (FIG. 2) receives instructions to do so when processing the content for viewing by the client. It should be understood that the content is a complete image with the message being an optional addition to the image, preferably placed into the content in the appropriate size, scale, orientation, lighting, etc. (compare FIGS. 5a and 5b). Also, the message can be integrated by the object manager 30, by the content server of the access provider 38, by the access provider 14, or by the software at the client site 12. Alternatively, the messages may be stored on the content server 36 (shown in phantom) and integrated into the content as described above.

Information according to the present invention may be grouped according to particular advertising strategies. For example, the information conveyed may comprise a sequence of messages that are distributed within a single content experience. In other words, multiple messages—each perhaps somewhat different—may be displayed at one or more locations of a particular web page or web site over time. This arrangement has particular utility when the content is streamed, such as video, wherein the messages that are integrated vary in position, size, prominence within the content, and time of appearance and duration. Alternatively, one or more messages may be configured to require consumer on-line interaction with the message, such as by requesting a user to "click-on" an icon, which may then morph to fully carry out the message. Also, a strategy of creating one or more brand messages within a sequence may be used to mirror the on-line content in which the message is integrated. This may be done, for example, by including kitchen related products within content illustrating a kitchen environment as is described in more detail below.

Referring now to FIG. 3, once the message has been generated for insertion into specific content, an insertion order 42 is prepared to facilitate scheduling of the message dissemination. For example, depending on the marketing strategy intended, the message may be inserted into whatever content is requested at a given day and time, this information is stored as at 44, and the schedule of messages then may be inserted within a given time period, by storing such information as at 46. In any case, an order to insert a message is generated and transmitted to either the content server 36 or the message server 38. Information management and storage preferably is achieved through conventional software programming techniques.

Figure 4B:
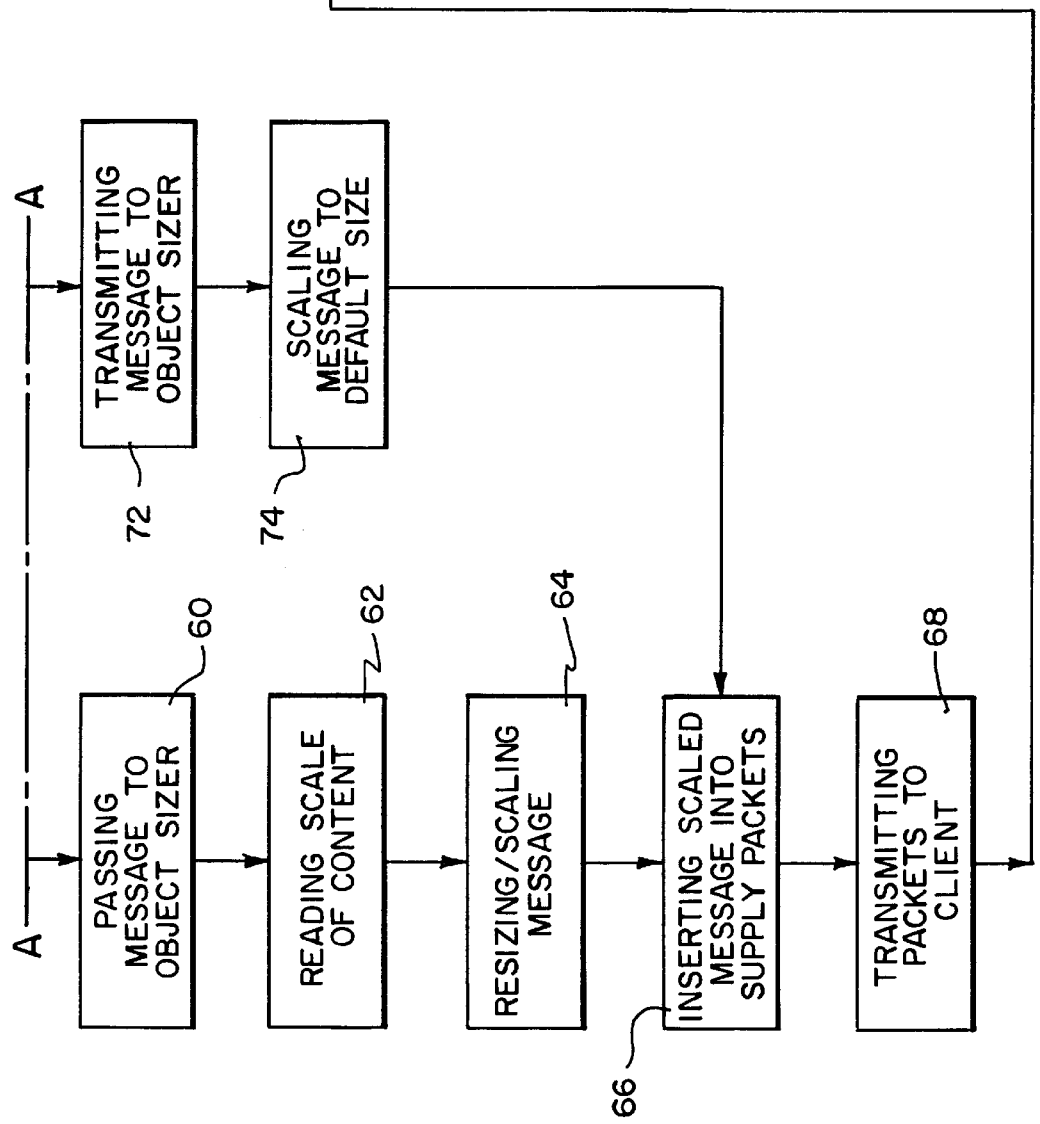

Referring now to FIGS. 4a and 4b, the method of the present invention according to one embodiment, includes steps that define the operation of the system 10 described above. A client session begins when a user selects a desired web page by designating the corresponding server's URL address, at step 50. This is accomplished either by typing the address in the specified location of the browser display and initiating a "go to" command or by clicking on an identified link in a web page. The browser, in response to the command, then directs a request, at step 52, to the corresponding server residing at the selected address.

The object manager 30 (FIG. 4a) monitors or listens to all server requests, at step 54. The object manager then queries the message server, content server, or local internal file, at step 55, to determine whether a message has been designated for integration with the content that has been requested. If a message has been designated for integration with the content, at step 56, the object manager then determines, at step 57, whether a scale parameter for that content has been specified. If a message has not been designated, the content is transmitted in a conventional manner to the user (step 56a) as a complete image (See FIG. 5a, for example). On the other hand, if a scale parameter is specified, the object manager retrieves the designated message, at step 58, and passes it to the object sizer 32, at step 60 (FIG. 4b). The object sizer reads the size or scale of the content from the object manager, at step 62, and resizes the message, at step 64. Preferably, the object sizer 32 or other module adjusts various message parameters such that the message has the appropriate orientation, shading and perspective to blend with the content into which it is to be inserted. Such adjustments are made to the extent that such parameters have been specified, as at step 57. The rescaled/resized message is then inserted by the object manager, at step 66, into the reply packets containing the content. The reply packets are then transmitted, at step 68, by the object transport 34 and downloaded to the client 12.

If the scale of the content is unspecified, the object manager 30 retrieves the designated message, at step 70, and transmits it to the object sizer 32, at step 72, for the message to be scaled, at step 74, according to a predetermined default size, which may be a scaling factor of 1.0 (or 1.0, 1.0, 1.0 for each X, Y, Z direction, respectively), in other words, no scaling of the message in the absence of a content-scale specified factor. The re-sized and rescaled message is then inserted by the object manager, at step 66, into the reply packets for transmission to the client at step 68. Other parameters such as orientation, color, hue, and shading, for example, can be handled the same way.

The reply packets transmitted by the object transport 34 are received by the object link 18, at step 76, in the object placer 16. The object runner 20 integrates the message into the content, at step 78, in the size provided by the object manager, location designated in the content, and with any other message-modifying parameters that may have been specified to better ensure that the message is integrated into the content. The message and content may then be displayed as a modified environment, at step 80, providing for example, text, graphics, animation, sound, video and pass on JavaScript or 3D objects that may be used in the message. The object reporter 22 (FIG. 2) maintains a dynamic link, at step 82, with the object manager during display.

Figure 5A:
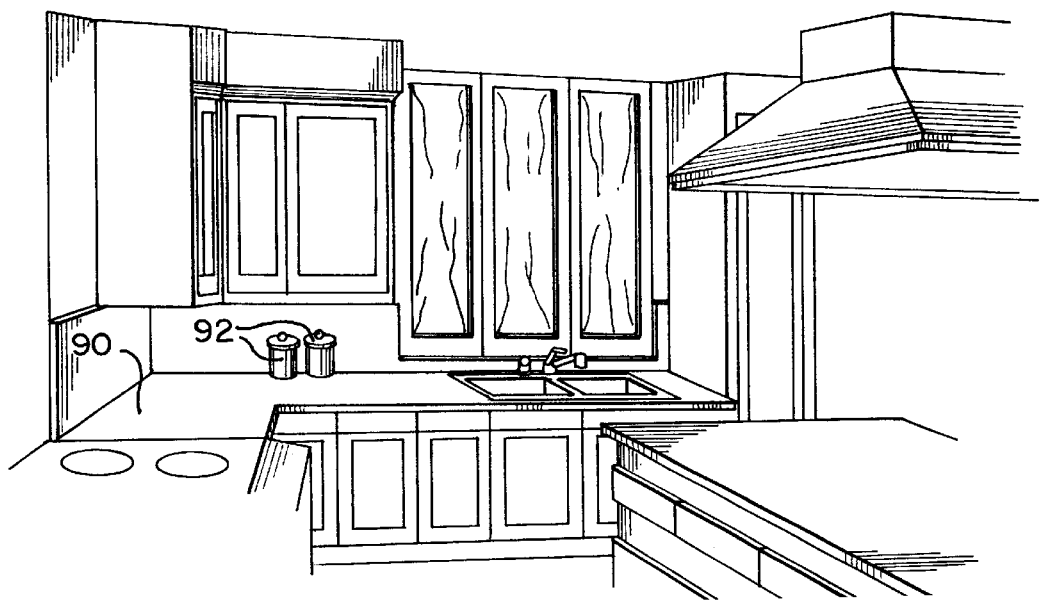
FIG. 5a illustrates a selected image for display.
Figure 5B:
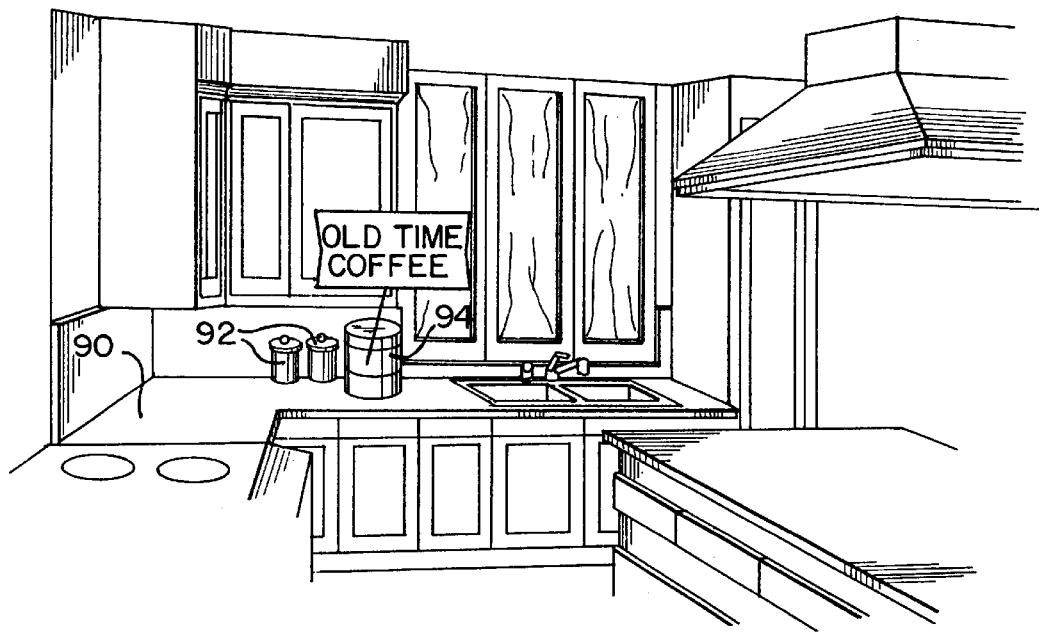
FIG. 5b illustrates an image of a scaled message integrated into the selected content of FIG. 5a according to the present invention.

An example of a message conveyed in accordance with the present invention is shown in FIGS. 5a and 5b. The selected content of FIG. 5a here comprises, initially, a kitchen environment having a counter-top 90 visually supporting a pair of counter-top objects 92. The content is rendered in a perspective view, and may be a static image such as a JPEG or GIF image, a current frame from an animated GIF file or streamed content, or may be a rendered representation of a virtual reality image from a given viewpoint. Referring to FIG. 5b, a message appears positioned adjacent the objects, and comprises a correspondingly sized coffee container 94 labeled with a manufacturer's brand name. Because the container is integrated into the displayed kitchen environment, due to the integrating step 78, the attention given by the user generates a higher level of cognitive processing and recall, creates a positive association and has other advertising benefits that, in the long run, should significantly affect the user's purchasing behavior.

Figure 6A:
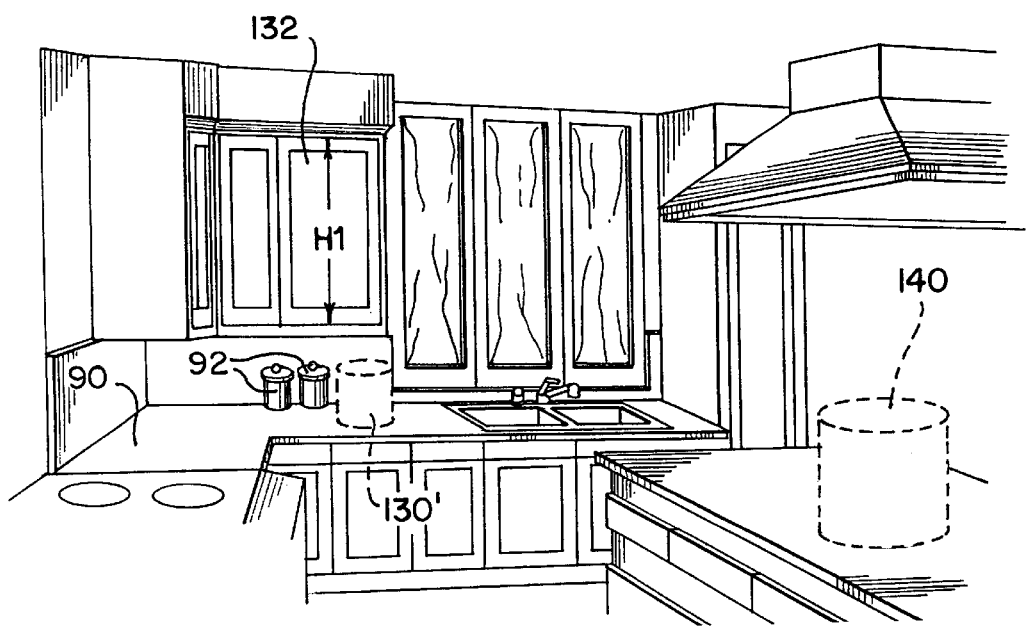
FIG. 6a illustrates the selected image of FIG. 5a, now showing designated locations for integrating a message.
Figure 6B:
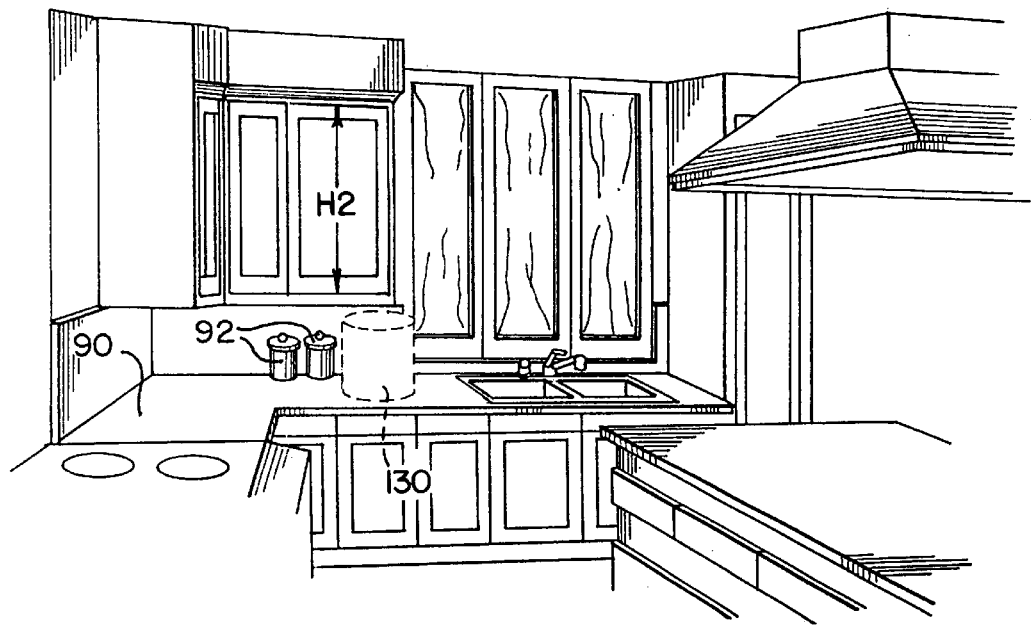
FIG. 6b illustrates the selected image of FIG. 6a from a close-up position.

With references now to FIG. 6a, locations 130, 140 are illustrated as two exemplary locations at which a message can be integrated into the depicted scene (here, a kitchen). Each of the locations 130, 140 has a scale associated with it, for example, one times a default value and a two times the default value, respectively. The differences in scale between locations 130 and 140 is due to the perspective of the scene in FIG. 6a, wherein location 140 is in the foreground and location 130 is in the background. Because location 130 is further away, it is naturally of a smaller size and grouped closer together with other objects such as counter-top objects 92. The actual size of the message (such as the coffee container 94 illustrated in FIG. 5b) varies with the proximity of the viewer's position relative to the location of the object. In other words, the same message placed at location 130 in FIGS. 6a and 6b would have a different scale corresponding to the position of the viewer. Thus, in FIG. 6b, the scale of a message at location 130 may be two times the default value because the image is being viewed from a closer position, albeit from the same rotational perspective as FIG. 6a.

For static frames, only a single scale need be associated with the location 130 to enable integration of the message into the depicted image. Preferably, also associated with the location 130 are other specified parameters including perspective, orientation, shading, color, and the like. For streamed content, however, additional scale factors are required, for example, as the viewer moves from the camera perspective of FIG. 6a to the camera perspective of FIG. 6b. That is, as a stream of video content is displayed on the screen, the viewer may move, as in a tour, through the kitchen from the distant position (relative to the message 130) shown in FIG. 6a to the close-up position shown in FIG. 6b.

In order to better ensure that a message is integrated into its surrounding content in a consistent manner, in accordance with an aspect of the invention, at least some of the individual frames in the streamed video content have for each specified location 130, 140, etc., the requisite scale factor, perspective, orientation, shading, color, and the like associated with such frame so that, as the individual frames of the streamed video content are displayed on the screen, the message at the various locations 130, 140 will continue to have the appropriate scale for the viewer's perspective and any other attributes necessary to make the message appear consistently relative to the surrounding, original content as though it were part of the original content.

As described above, if a message has been designated for integration within the content, the object manager can determine, for example, at step 57, whether a scale parameter has been specified for the particular frame of the content that is presently being processed. If the scale parameter has been specified, and if other parameters have been specified such as the perspective, orientation, shading, and the like, then the message file can again be retrieved and passed to the object sizer and other object manipulators to transform the message, such as at step 66, into a scaled and properly oriented, shaded, etc. message for insertion into a packet and transmission to the client, as at step 68.

Messages to be integrated into content can be scaled relative to real-world objects, with objects in the content being assigned a real-world scale so that the message can be scaled relative thereto, or messages can be scaled relative to the features shown in the content into which they are placed. The latter method is preferred, and may correspond in scale to the actual object size or may differ therefrom. For example, a soda can to be displayed at location 140 of FIG. 6a has a scale which could be enhanced say 15% to provide a subtle prominence to the object amongst the other objects in the kitchen scene.

In particular, a base-line scale can be established using an object or feature in the frame (content) which is in close proximity to the selected location into which the message is to be placed. For example, the cabinet door 132 appears in the frames depicted in FIGS. 6a and 6b, and may appear in a series of frames therebetween which show the progression of the viewer through the kitchen generally toward that cabinet. As the viewer's proximity to the cabinet 132 changes, so does its height. In other words cabinet 132 has an apparent height (which we equate with size, for ease of discussion) H1 in FIG. 6a and a greater height H2 in FIG. 6b.

In accordance with the invention, the message to be integrated at location 130 can be dynamically scaled with reference to an element in a frame other than the message itself, for example, the counter-top objects 92 or the cabinet 132. Thus, a scale factor can be established for the message (or the reference message) in the frame shown in FIG. 6a, and a corrected scale factor can be applied to the message for the frame of FIG. 6b by modifying the scale factor in view of the change in size (height) of another object, namely, a reference object. For example, location 130 can have a scale factor SF130 associated with the frame shown in FIG. 6a which is not modified further because this frame is the frame at which the scale is determined (position=0). However, scale factor SF130 may be modified by a real number (H2/H1), called a position factor, which is obtained by determining changes in size of the reference object (here, the cabinet 132) to account for the change in the viewer's position. Of course, there is no change in position and no need for a position factor when only one frame is to be displayed. Further, a position factor need not be used if different scales factor are associated with the several frames in the streamed content.

The computer is preferably programmed to track the reference object in from frame-to-frame to automatically compute the changes in scale needed to maintain the size of the message from frame-to-frame.

In virtual reality environments, the content may be specified by a VRML file, which is a textual description of a VRML graphic. The VRML file dictates how and where to draw shapes, their color and other attributes to render a three dimensional virtual world. Like HTML files, VRML files can be linked to create a seemless environment. In the context of the present invention, a message can be provided as a VRML file, which is selectively grouped with other VRML files to complete a virtual scene. For example, the kitchen of FIG. 5a can constitute a group of VRML files that are grouped together as children or child nodes managed by a single parent node. In the event that a sponsor has paid for or otherwise been approved to have its message included within the VRML image, then that sponsor's message, which is in the form of a VRML file, can be included in the group for a predetermined period to time such that when the virtual image is rendered, the message is included in the scene, for example, as illustrated in FIG. 5b.

A particular benefit of virtual reality modeling is that content and messages can be independently created, with the particular message having a textual description of how the shape is to be drawn, its color, and its material which specifies, among other things, the specular nature of the object, whether it's emissive, shiny or transparent, etc. In addition, a VRML object has a scale factor associated with it as well as a scale orientation (that is, a rotation axis and a degree of rotation) which readily enables the message to be incorporated into a larger virtual world. Further, the VRML language includes a "perspectivecamera" node which will fit the shape specified in the message's VRML file into the overall image, for example, into the overall image of the kitchen depicted in FIG. 5a. When the message is grouped together with other VRML files that comprise the desired image, the message is seemlessly integrated into the content.

Importantly, providing a advertising element in the form of a message as a separate VRML file provides a flexible basis for integrating the advertisement into existing content. Thus, in a virtual reality environment, a user can click upon a cabinet within the kitchen, causing the cabinet to open, to thereby reveal the interior of the cabinet with an advertisement in the form of a VRML file having a desired size and scale integrated with the image of the cabinet interior.

Figure 7:
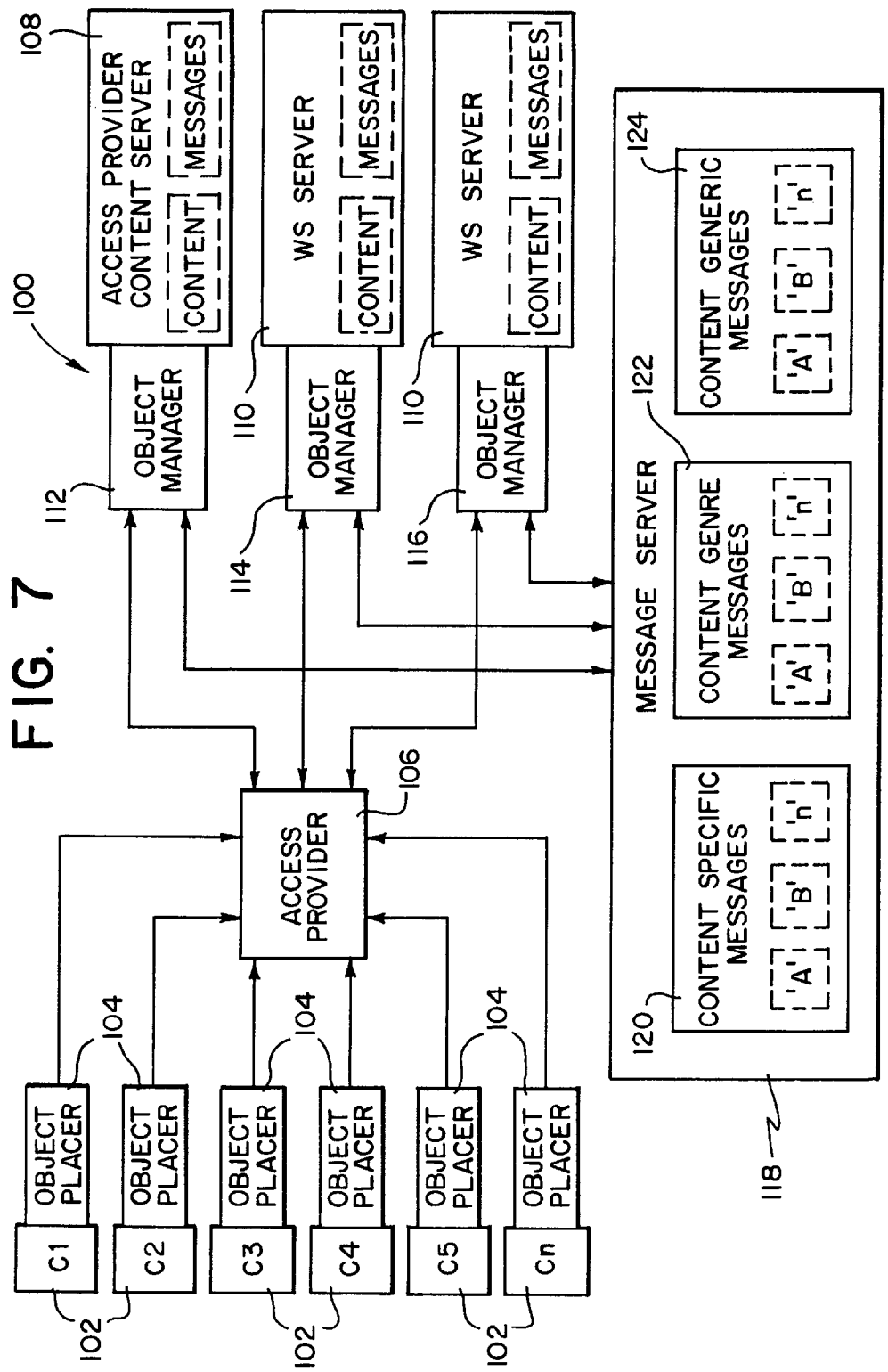
FIG. 7 is a block diagram of an interactive communications system according to a second embodiment of the present invention.

Referring now to FIG. 7, an interactive system according to a second embodiment of the present invention, generally designated 100, incorporates a similar architecture to that described in the first embodiment. The system includes one or more clients 102 having, respectively, an object placer 104 and operating through a web browser to communicate with an access provider 106 to a selected access provider content server 108 or web site server 110. The respective servers include respective resident object managers 112, 114 and 116 that connect through a message server 118 to integrate content specific messages 120, content genre messages 122 or content generic messages 124 into the selected content.

Operation of the interactive system of the present invention proceeds very similarly to that of the first embodiment. However, instead of having a single object manager implemented with a stand-alone server to listen to each request, only the respective object manager resident with the specified content server listens to the request to perform the message-to-content transformation. In all other respects, the system operates similar to that of the first embodiment.

Downloading messages from the servers typically takes place after a third party such as an advertiser compensates the owner, publisher, and/or distributor of the content for the right to include the message within the content. Either directly or through an agent, the advertiser or other third party prepares and produces the message and stores the message on a message server in a useable format.

The programmed messages may take a myriad of forms, such as static or animated icons, 2D and 3D graphics and animation, text, audio recordings or any object that may stand alone or be imbedded. Additional types of messages include future objects that have modular forms, or any objects that may be created. The messages also may include platform-independent application objects which morph within the content when displayed, such as applets written in JavaScript or rich-text elements which activate in response to movement or usage of a mouse operated by the user at clients 102. The applets reside on the server as a component of the message and are downloaded with the message to the client browser.

Those skilled in the art will appreciate the many benefits and advantages afforded by the present invention. Of significant importance is the scaled integration of a message with correspondingly sized features in a selected environment specified by a user to maximize attention to the message. Attracting attention to a message in this manner substantially increases the cognitive processing and subsequent recall of the message, creates a positive association and has other advertising benefits, thereby tending to influence buying behavior. In three-dimensional, perspective, or streamed video/audio environments, it is preferred that orientation, shading and the like of the message also be transformed to better ensure that the message is integrated into the content so that the user cannot discern that the message was added to the (underlying) content.

Another advantage of the present invention is the straightforward adaptability of the system components and steps to existing network architectures. Consequently, implementation of the invention requires only a minimum amount of additional hardware, with most features conveniently employable in the form of software. By minimizing the use of additional hardware, the costs necessary to implement the invention are minimal.

In addition to contributing to minimal hardware costs, the capability of attracting high quality attention to messages from a significant number of users will provide pressure to lower the costs of advertising on the Internet.

Presently, streamed content is made available on the Internet by digitizing the images that have been captured on film or videotape, compressing/encoding the digitized video, and making the video available on an Internet server. A client typically accesses a server using his or her Internet browser and the server then provides the streamed video. While the presently preferred application of the present invention is to streamed content as may be provided over the Internet or other wide-area computer network, the invention is not so limited. The invention has application to conventional film and video technologies, for example, to integrate messages such as advertisements into broadcast or cablecast signals.

In accordance with a further aspect of the invention, locations such as locations 130 and 140 of FIG. 6a are identified within one or more frames of a video signal, preferably, a digitized video signal relative to coordinate axes assigned to the display screen (for example, the lower left corner of the screen may be set to be the origin with other coordinates on the screen identified relative to that origin). In addition, a scale factor, and/or other parameters are assigned to each such location for a given video frame (including, for example, the perspective, location of light source, and light intensity), each of which may also be defined in terms of their X, Y and Z values. For example, if the perspective of the frame on the screen is such that the viewer is looking straight ahead, then the coordinates from the perspective may be assigned X and Y values that correspond to the middle of the screen. Likewise, if the perspective is looking down from above, then the X value may be assigned the middle of the screen and the Y value assigned the top of the screen. The Z value for the perspective may be used to define the relative proximity of the viewer to the object being viewed.

Hardware and software may be employed to scan the video signal into a series of digital frames and to assist in identifying the coordinates and scale values for each location within digitized frame into which a message can be integrated.

Advantageously, a software-based user interface can be provided to assist in identifying the parameters necessary to specify the location, scale, and orientation of the message as well as the position, amount, color and hue of the lighting. Such an interface may display a graphical image or frame of streamed content on a computer display screen and permit the user to superimpose a reference message which can, thereafter, be repositioned, rotated, and scaled by the user until the reference message fits the content into which it has been placed. For example, the reference message may take the form of a cylinder or box having a known size and scale and perhaps text such as "Your Ad Here" inscribed on one or more of its surfaces. Because the reference has a known size, any adjustment therefrom provides a basis for scaling other messages (at a later time) to an appropriate size based on the scaling from the reference message's base-line size. The user can manipulate the reference message until it is suitably positioned, scaled and oriented within the frame being displayed. Once the reference message has been transformed using an input device such as a mouse or graphics tablet, the parameters that were used in the transformation can be stored and electronically associated with that frame. In particular, the association of the parameters used to transform the reference message can be stored along with the digital stream that constitutes the digitized graphical image or frame, or can be electronically associated with the frame and stored separately. Alternatively, the transformation parameters can be included with the image in an analog form.

The transformation parameters obtained using the reference message thereafter can be applied to any selected message, applet, or icon that is to be integrated into that frame (content). Further, transformation parameters can be obtained for each of the frames in the series of digital frames, or for a subset of the frames. For example, if the frames are conveyed to an electronic display at a rate of 12 frames per second or more (the broadcast standard being 24 frames per second (fps)), then transformation parameters may be obtained and used to transform the message for every other frame, or for two frames per second.

In lieu of the reference message, the actual message to be integrated into that frame can be used; however, the actual message to be used may not be known until a later time, for example, until after a price has been set for integrating the message into the image. Use of the reference message permits the transformation parameters to be associated with particular frames independent of the particular message or icon to be inserted.

Referring again to the image illustrated in FIG. 5a, that image can correspond to a digitized frame from footage taken from a situation comedy to be broadcast by a network television station. The depicted image is a kitchen, and an advertiser of kitchen related products which is desirous of having its product appear on the counter 90 within the kitchen can have an icon or message relating to its product integrated into several frames of the show in accordance with the present invention.

Prior to broadcasting the show, individual frames of the video signal (including the frame depicted in FIG. 5a) are preferably digitized and analyzed for potential locations into which a message such as the coffee container 94 can be integrated. As described above, two locations have been identified in the frame of FIG. 5a, as shown in FIG. 6a.

With reference now to FIG. 8, a plurality of frames 142 are made available to a programmed computer which can be used to identify locations within each frame into which a message can be integrated, and which can be used to specify the transformation parameters for each such location, as at step 144. The locations and respective transformation parameters can then be used to integrate the advertiser's message or icon into one or more graphical images, which may be selected from a series of frames from film or video footage, for example.

For each identified location, at step 146, the transformation parameters are applied to the message so that the message can be integrated into the frame, at step 148. The frame and message can then be encoded at step 150, if desired, and sent together for display on television sets. Alternatively, the integrated message and frame can be transmitted in an unencoded form for display on television sets.

The encoding step 150 provides particular advantages in the context of computer-related transmissions and other digital transmissions (e.g., direct satellite broadcasts) where digital compression through encoding reduces bandwidth constraints by reducing the amount of transmitted data.

While the invention has been particularly shown and described with reference to the preferred embodiments thereof, it will be understood by those skilled in the art that various changes in form and detail may be made therein without departing from the spirit and scope of the invention.

For example, while the method and system of the present invention have been described in the context of the Internet, it is anticipated that the invention may be employed in any interactive environment. Such environments include relatively small-scale intranets in addition to personal computer systems running CD-ROM devices effecting interactive communication.

What is claimed is:

1. A method for integrating a message at a specified location within content which includes a graphical image for display on an electronic display, comprising the steps of:

retrieving transformation parameters programmed into the content and associated with the specified location of the graphical image, the transformation parameters including a scale factor;

transforming the message in accordance with the retrieved transformation parameters;

superimposing the transformed message on top of the graphical image to create an integrated image; and conveying the integrated image to the electronic display.

2. The method as in claim 1, wherein the content includes plural frames and wherein at least a portion of the frames include the transformation parameters.

3. The method as in claim 2, wherein the integrated message is conveyed at a rate of at least 12 frames per second.

4. The method as in claim 3, wherein at least one frame conveyed each second includes the transformation parameters.

5. The method as in claim 1, wherein the transformation parameters further include orientation data.

6. The method as in claim 5, wherein the transformation parameters further include lighting data.

7. The method as in claim 1, wherein the electronic display is a television display screen.

8. The method as in claim 1, wherein the electronic display is a computer display screen.

9. A method for programming into content transformation parameters which specify at least one locality within a graphical image at which a message can be integrated at a later time, comprising the steps of:

(a) displaying a frame of the content which includes the graphical image on a display screen of a computer as a background image;

(b) superimposing a preselected message having a predetermined scale as a foreground image on the display screen;

(c) permitting the foreground image to be translated while the background image remains unaffected until the foreground image is positioned in a selected locality within the graphical image;

(d) permitting the foreground image to be scaled while the background image remains unaffected until the foreground image is scaled in a selected scale factor at the selected locality within the graphical image;

(e) programming into the content the location of the selected locality and the selected scale factor as the transformation parameters for the frame of the graphical image.

10. The method as in claim 9, including the further steps of permitting rotational orientation of the foreground image while the background image remains unaffected and programming into the content the rotational orientation of the foreground image as an additional transformation parameter for the frame of the graphical image.

11. The method as in claim 10, including the further steps of permitting the position, amount, and color of the light to be cast upon the foreground image to be modified to match the lighting at the selected locality of the graphical image and programming into the content the modified position, amount and color of the light to be cast upon the foreground image as additional transformation parameters for the frame of the graphical image.

12. The method as in claim 9, wherein the preselected message is a reference message having a predetermined size, scale, and rotational orientation.

13. The method as in claim 9, wherein the graphical image is a digital image.

14. The method as in claim 13, wherein the digital image is a file in one of a JPEG, GIF, and bitmat format.

15. The method as in claim 9, wherein the graphical image includes plural frames, the method including the additional step of advancing the graphical image to a subsequent frame and repeating steps (a) through (e) inclusive.

16. The method as in claim 15, wherein the graphical image is advanced multiple frames prior to repeating steps (a) through (e) inclusive.

17. The method as in claim 9, including the additional step of digitizing the graphical image into plural frames for individual display on the display screen of the computer as individual background images.

18. A method for programming into content transformation parameters which specify at least one locality within a graphical image including plural frames, comprising the steps of:

(a) displaying a first frame of the content which includes the graphical image on a display screen of a computer;

(b) superimposing a preselected message having a predetermined scale as a foreground image on the display screen;

(c) permitting the foreground image to be translated while the graphical image of the first frame remains unaffected until the foreground image is positioned in a selected locality within the graphical image;

(d) permitting the foreground image to be scaled while the graphical image of the first frame remains unaffected until the foreground image is scaled in a selected scale factor at the selected locality within the graphical image;

(e) permitting a user to select a reference object within the first frame, the reference object having a dimension; and (f) programming into the content the location of the selected locality, the selected scale factor, and the dimension of the reference object as it appears in the first frame (H1) as the transformation parameters for the first frame of the graphical image.

19. The method as in claim 18, including the additional steps of:

(f) locating the reference object in a second frame;

(g) determining the dimension of the reference object as it appears in the second frame (H2); and (h) associating with the second frame the dimension H2.

20. The method as in claim 19, including the additional step of associating with the second frame a scale factor which generally corresponds to the scale factor of the first frame multiplied by (H2/H1).

* * * * *

UNITED STATES PATENT AND TRADEMARK OFFICE
CERTIFICATE OF CORRECTION

PATENT NO. : 6,243,104 B1
DATED : June 5, 2001
INVENTOR(S) : Peter Noel

It is certified that error appears in the above-identified patent and that said Letters Patent is hereby corrected as shown below:

<u>Title page,</u>
[*] Notice, Please add -- This Patent is Subject to Terminal Disclaimer --.
Item [56], References Cited, insert the following:

| | | | |
|---|---|---|---|
| -- 6036601 | 03/14/00 | Heckel | 463/42. |
| 5953076 | 09/14/99 | Astle et al. | 348/584. |
| 5892554 | 04/06/99 | DiCicco et al. | 348/584. |
| 5808695 | 09/15/98 | Rosser et al. | 348/584. |
| 5731846 | 03/24/98 | Kreitman et al. | 348/581 |
| 5627915 | 05/06/97 | Rosser et al. | 382/219 |
| 5543856 | 08/06/96 | Rosser et al. | 348/578 -- |

OTHER REFERENCES
-- Ubois, Jeff; "You get what you pay for ? Advertising on the net not such bargain", Digital Media, v5 n3 p3-7, Aug. 7 (4), 1995.

Riordan, Teresa, "Patents: adding Some Value to Internet Ads," New York Times, Dec. 23, 1996

What is Streaming? http:/www.unc.edu/courses/ssp/streaming/streaming.html

A Little Bit About Streaming Audio-How Does It Work?

http://ils.unc.edu/~geisg/310/how,html

A Little Bit About Streaming Audio-What Are The Applications?
http://ils.edu/~geisg/310/uses.html How To Steam Video http://ils.unc.edu/video/how.html Streaming Video Quality http://ils.unc.edu/video/quality.html

UNITED STATES PATENT AND TRADEMARK OFFICE
CERTIFICATE OF CORRECTION

PATENT NO. : 6,243,104 B1
DATED : June 5, 2001
INVENTOR(S) : Peter Noel

It is certified that error appears in the above-identified patent and that said Letters Patent is hereby corrected as shown below:

VRMl Project http://www.csse.usf.edu/~hoang/java/vrml-proj.html

Floppy's VRML Guide www.ee.surrey.ac.uk/Personal/ee41rs/vrmlquide/ --

Signed and Sealed this

Second Day of July, 2002

*Attest:*

JAMES E. ROGAN
*Director of the United States Patent and Trademark Office*

*Attesting Officer*